DIGITAL COMPUTER INSTRUCTION SEQUENCING TO CARRY OUT DIGITAL DIFFERENTIAL ANALYSIS

Filed Dec. 6, 1967 4 Sheets-Sheet 1

INVENTORS
Mamoru Hosaka
Fumio Ando
Masatsugu Yoshitake
BY Craig & Antonelli
ATTORNEYS INVENTORS
Mamoru Hosaka
Fumio Ando
Masatsugu Yoshitake
BY Craig & Antonelli
ATTORNEYS INVENTORS
Mamoru Hosaka
Fumio Ando
Masathugu Yoshitake
BY Craig & Antonelli
ATTORNEYS FIG. 10E
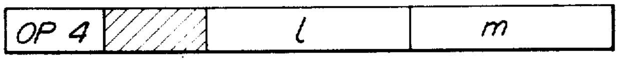
FIG. 10F
FIG. 10G
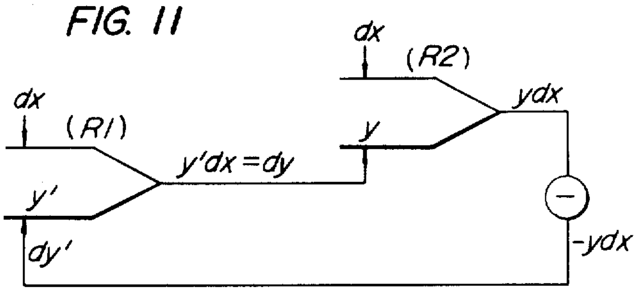
FIG. 11
FIG. 12
| ADDRESS | OP | DX l DZ SCL | m | REFERENCE |
|---|---|---|---|---|
| 0 | CAD | | 11 | 1 → AC |
| 1 | DBX | DZ=0 | 2 | OP 5 |
| 2 | CAS | DX=0 l=3 | 12 | OP 0 |
| 3 | AMS | l=2 | 14 | OP 4 |
| 4 | DBY | DZ=0 SCL=K | 13 | OP 6 |
| 5 | CAD | | 11 | 1 → AC |
| 6 | DBX | DZ=0 | 7 | OP 5 |
| 7 | CAS | DX=0 l=3 | 13 | OP 0 |
| 8 | AMS | l=2 | 15 | OP 4 |
| 9 | DBY | DZ=1 SCL=K | 12 | OP 6 |
| 10 | UJP | | 0 | |
| 11 | 1 | | | |
| 12 | y' | | | |
| 13 | y | | | |
| 14 | R1 | | | |
| 15 | R2 | | | |
INVENTORS
Mamoru Hosaka
Fumio Ando
Masatsugu Yoshitake
BY Craig & Antonelli
ATTORNEYS United States Patent Office 3,555,514

Patented Jan. 12, 1971

3,555,514

DIGITAL COMPUTER INSTRUCTION SEQUENCING TO CARRY OUT DIGITAL DIFFERENTIAL ANALYSIS

Mamoru Hosaka and Fumio Ando, Tokyo, and Masathugu Yoshitake, Yokohama, Japan, assignors to Hitachi, Ltd., Chiyoda, Tokyo, Japan, a corporation of Japan Filed Dec. 6, 1967, Ser. No. 688,514
Claims priority, application Japan, Dec. 9, 1966, 41/80,354
Int. Cl. G06f *9/20*
U.S. Cl. 340—172.5 6 Claims

ABSTRACT OF THE DISCLOSURE

A digital computer for performing the arithmetic operations for the differential analysis of data in accordance with a stored program. In this digital computer, the arithmetic operations for the differential analysis are executed by special instructions which can be handled in a manner entirely similar to the handling of those instructions employed in a general purpose computer.

BACKGROUND OF THE INVENTION

This invention relates to electronic computers and more particularly to a digital computer of the kind in which the arithmetic operations for the differential analysis of data are performed in accordance with a store program.

The digital computer of the kind described above is commonly called a digital differential analyzer. The digital differential analyzer is a special purpose computer which is primarily intended to perform the digital analysis of various linear and nonlinear differential equations encountered in the field of physical science as well as engineering, and is preferred in that it can easily solve these differential equations at high speed and yet with a relatively high degree of precision.

PRINCIPLE OF DIGITAL DIFFERENTIAL ANALYZER

As is commonly known, the basic component for performing the arithmetic operations to be handled by the digital differential analyzer is an integrator which carries out the integrating operation according to the well-known method of partial quadrature or integration by parts. For example, an integral of a function $y=f(x)$ from $x=x_0$ to $x=x_n$ can be approximately given by the equation $$Z=\int_{x_0}^{x_n} y\cdot dx \doteq \sum_{i=0}^{n-1} y_i\cdot\Delta x_i \qquad (1)$$

according to the method of integrating the products representing successive rectangular areas as shown in FIG. 1. In order to obtain a further higher degree of approximation with the use of the same values of $\Delta x_i$, the method of integrating the products representing successive trapezoidal areas may be employed, but this method has no relation to the present invention. Description herein will be given by reference to the former method or method of integrating the rectangular areas for the sake of simplicity.

The digital differential analyzer is composed of a plurality of integrators each having a structure as shown in FIG. 2. More precisely, the arithmetic operation performed by each individual integrator can be expressed as $$dz=y\cdot dx \qquad (2)$$

and the increment $dz$ obtained as a result of the above operation is supplied or distributed to another integrator where the increment is integrated to give the result shown in Equation 1. Describing in more detail, each individual integrator comprises two registers called an R register and a Y register, respectively. The Y register is a register which holds therein the value of $y$ in Equation 2. An increment $dz$ preliminarily specified according to a pre-established program is delivered from an integrator and is supplied to the next integrator as an increment $dy$, which is supplied to an adder 2, thence to the Y register. In this case, the input to the adder 2 is not necessarily a single increment $dy$, but a plurality of increments $dy_j$ ($j=0, 1, \ldots$) may be supplied to the adder 2. In this latter case, an arithmetic operation $$y=\int dy \doteq \sum_i \left(y_i-1+\sum_j dy_i\right) \qquad (3)$$

is performed in the Y register.

On the other hand, the R register stores therein the remainder of the increment $dz$ which is left after such increment $az$ has been quantized. A multiplier in the integrator checks the product $y\cdot dx$ when an increment $dx$ appears as an input thereto, and an adder 1 receives the product $y\cdot dx$ and adds it to the content of the R register. If an overflow from the R register occurs, such an overflow represents the increment $dz$ described above. The integrator of this kind is symbolically shown in FIG. 3, from which it will be seen that an increment $dy$ added to the Y register provides the value of $y$, and upon appearance of an increment $dx$ as an input to the integrator, an output which is an increment $dz=y\cdot dx$ is delivered from the integrator.

In prior art digital differential analyzers adapted for performing arithmetic operations as described above, means such as a delay line was employed to form the R register and the Y register, and the hardware was combined therewith to constitute a special purpose computer, as is commonly known. The prior art digital differential analyzer having such a structure and function has many defects as described below:

(1) The digital differential analyzer is quite inefficient in its arithmetic computation of discontinuous quantities compared wth a general purpose computer. The digital differential analyzer is far more efficient than the general purpose computer in the processing of continuous quantities because of the fact that the digital differential analyzer handles the data in the form of an increment as described above. However, the digital differential analyzer is inferior to the general purpose computer in that, while the later needs only one operation for the arithmetic computation of discontinuous quantities, for example, for the multiplication of two numbers $u$ and $v$, the former requires a troublesome operation because the function of these two numbers must be translated once into a differential equation of the form $$d(u\cdot v)=u\cdot dv+v\cdot du \qquad (4)$$

and this equation must be solved as illustrated in FIG. 4. Further, this method requires a lot of computing time for the arithmetic operation of such an equation.

(2) In the digital differential analyzer, logical judgement and sequential control are difficult to make. The general purpose computer is commonly provided with instructions having these judgement and control functions and is far superior to the digital differential analyzer whose basic component elements for performing the arithmetic operations are integrators of the kind described above or at most such integrators which are additionally endowed with certain other functions.

(3) The integrating operation sequence in the digital differential analyzer is predetermined by the structure of the hardware. The sequence of arithmetic operations performed by the integrators is fixed and can not be varied because of the fact that delay lines are utilized to form the registers as pointed out in the above. Therefore, even when one of the integrators is not in use or when the increment $dx$ or $dy$ is not distributed to one of the integrators, that is, there is an integrator for which no arithmetic operation is required, time allotted to the particular integrator must wastefully be consumed.

In the digital differential analyzer, the arrangement of the registers in each integrator is also fixed besides the predetermined integrating operation sequence. More precisely, each individual integrator has its own Y register and R register, and it is impossible to arrange a plurality of Y registers for a single R register and to arrange a plurality of R registers for a single Y register. The lack of versatility described above resulted in the necessity of providing many integrators and a corresponding increase in time for arithmetic operations. More practically, for the successful computation of an equation, for example, $dz=y_1 \cdot dx_1+y_2 \cdot dx_2$ with the prior art digital differential analyzer, the analyzer required the provision of two integrators for the computation of $y_i \cdot dx_i$ ($i=1, 2$) and an additional integrator for the addition of increments $dz_1$ and $dz_2$ delivered from the respective integrators as shown in FIG. 5. If a single R register could be used in common to two Y registers which hold therein the respective numerical values $y_1$ and $y_2$ as shown in FIG. 6, this means that the provision of only one integrator is apparently sufficient for the arithmetic operations to seek $$dz=y_1 \cdot dx_1+y_2 \cdot dx_2$$

Further, for the successful computation of two equations $$dz_1=y \cdot dx_1$$

$$dz_2=y \cdot dx_2$$

by the prior art digital differential analyzer, two integrators were required since an independent R register had to be provided for each of the Y registers as shown in FIG. 7 in spite of the fact that the Y registers stored therein have the same content. If two R registers could be connected in common to a single Y register as shown in FIG. 8, the capacity of the memory can be correspondingly reduced.

(4) The prior art digital differential analyzer has no versatility with respect to non-stored program. In the prior art digital differential analyzer, means such as a patch board was used in many cases to interconnect the integrators, and it was difficult to change the program so fixed. The prior art digital differential analyzer of some kind had a program preset in the memory. However, such a program was provided for the sole purpose of establishing a desired coupling between the integrators and did not contain therein other instructions such as logical instructions. Thus, the program stored in the prior art digital differential analyzer was far simpler than the program stored in the general purpose computer.

HYBRID COMPUTER

The digital differential analyzer had various defects as described above and was especially inferior to general purpose computers in the points (1) and (2) mentioned above. In an attempt to overcome the above defects, it has been proposed to connect the digital differential analyzer through a suitable connection means with a general purpose computer and to use this combination as a hybrid computer. However, such an attempt is merely intended to cover the above defects of the digital differential analyzer by connecting it with the general purpose computer and is not intended to provide a perfect combination for the compensation of the respective defects of the digital differential analyzer and the general purpose computer. In other words, various difficulties have arisen from the fact that the general purpose computer and the digital differential analyzer have a different character or purposes and the connection capacity therefore is limited to a certain extent. Further, in spite of such a combination, the prior art digital differential analyzer still has the defects pointed out in (3) and (4) here above.

SUMMARY OF THE INVENTION

It is therefore the primary object of the present invention to provide a digital computer which is free from the above defects involved in prior digital differential analyzers and can make the arithmetic operations for the digital differential analysis in accordance with a stored program.

Another object of the present invention is to provide a digital computer in which a general purpose computer and a digital differential analyzer are combined together in a more intimate relation than in the so-called hybrid computer and which can easily and rapidly perform the arithmetic operations for the differential analysis of data.

BRIEF DESCRIPTION OF THE DRAWINGS

FIGS. 10A–10G are schematic diagrams showing an instruction format employed in the embodiment shown in FIG. 9.

FIG. 11 is a schematic diagram showing a manner of connection between integrators in the embodiment of the present invention adapted for the solution of a specific differential equation.

FIG. 12 is a representation of a program employed in the embodiment of the present invention when used for the solution of the differential equation shown in FIG. 11.

DESCRIPTION OF THE PREFERRED EMBODIMENTS

Figure 9:
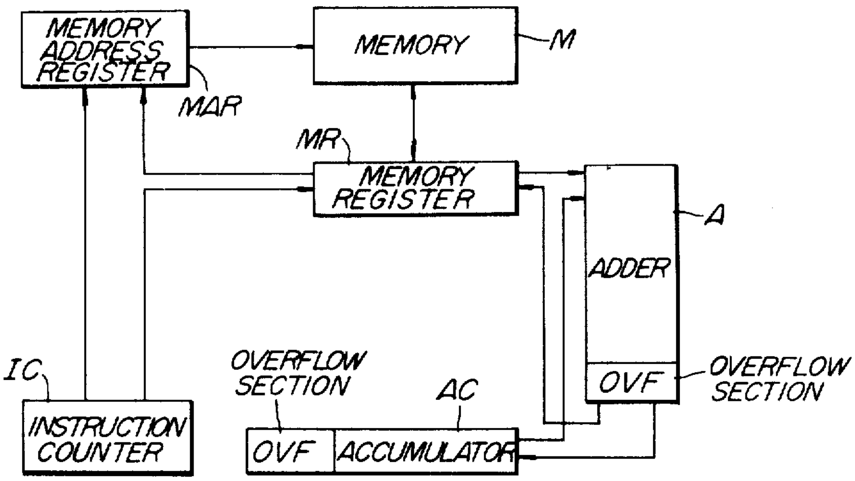
FIG. 9 is a block diagram of an embodiment of the present invention.
Figure 10A:
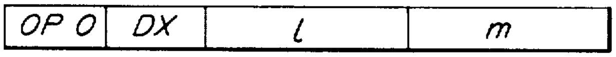
Figure 10B:
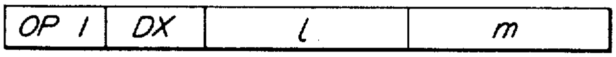
Figure 10C:
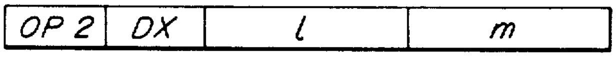
Figure 10D:

Referring to FIG. 9, there is shown a block diagram of an embodiment of the digital computer according to the present invention. In the block diagram, those portions of the digital computer which are to perform the digital differential analysis are solely shown, and are substantially the same as the corresponding portions of a conventional general purpose computer except for some portions of the arithmetic unit.

The digital computer according to the present invention comprises a core memory M, a memory address register MAR for selecting an address during the reading of data from the memory M or during the writing of data into the memory M, a memory MR for temporarily holding therein the data read out from the memory M or the data to be written into the memory M, and an instruction counter IC which is a register storing therein an address of the next instruction to be read out. The registers described above have a function which does not differ in any way from the function of the registers in a conventional general purpose computer.

An accumulator AC in the digital computer is a register which is an essential element for the performance of arithmetic operations, and at the same time, serves as a buffer register between the main memory and input/output devices. The accumulator AC in the invention differs from conventional accumulators in that it is additionally provided with an overflow section OVF having a sign. An adder A in the computer differs also from conventional adders in that it is additionally provided with an overflow section OVF having a sign. The provision of such signed overflow sections is of important significance for the execution of arithmetic operations for the digital differential analysis.

FIGS. 10A to 10G show instructions which are specifically prepared for the execution of arithmetic operations for the digital differential analysis to be performed by the digital computer embodying the present invention. The digital computer is further provided with such instructions as arithmetic instructions, logical instructions, conditional jump instructions and input-output instructions which are prepared in a format similar to that employed in a general purpose computer. In other words, the instructions employed in the present invention for the performance of the arithmetic operations for the digital differential analysis do not in any way differ in the format thereof from the format employed in a general purpose computer.

In the instructions shown in FIGS. 10A to 10G: OP 0–OP 6 designate an operation part; DX, a *dx* part for storing an increment in a manner as will be described later; 1 a jump address part for storing therein an address to which a jump is to be made under a specific condition in a manner as will be described later; *m*, an address part; CTL, a control part for supplementing the content of the operation part in a manner as will be described later; DZ, a *dz* part for indicating the sign of an increment *dz*; and SCL, a scaling part for indicating the number of shifted digits in a manner as will be described later.

The number of bits of these parts may suitably be determined as desired. In the present embodiment, the control part CTL and the *dz* part DZ are arranged to have definite numbers of bits of three and one, respectively. The number of bits of the operation part OP is determined depending on the type of instructions, and four bits are employed in the present embodiment.

The number of bits of the jump address part 1 may be reduced by employing a method of specifying a relative address with respect to the location of storage of a particular instruction, and three bits are employed in the present embodiment. The number of the relative address is counted from the address which stores the particular instruction, assuming the number of the particular address is zero. The number of bits of the address part *m* is determined by the capacity of the memory in the computer, but may be reduced by employing the well-known method of supplementing by means such as an index register. The number of bits of the scaling part SCL may be such that it can only sufficiently store the number of shifted digits, and four or five bits are considered sufficient in the present embodiment. In the present embodiment, therefore, the scaling part SCL has four bits. However, the number of bits of these parts referred to in the above is not intended to place any limitation thereto.

The operation of the digital computer embodying the present invention will now be described with reference to the instructions shown in FIGS. 10A to 10G.

(1) OP 0 Clear Add/Sub Special (CAS)

This instruction is intended to perform such an arithmetic operation in a series of arithmetic operations for the digital differential analysis that the content of the Y register should be multiplied by an increment *dx*.

It is assumed herein that, prior to the execution of this instruction, an increment *dz* delivered as an output from the integrator under consideration or another integrator (which is not constructed from hardware but consists of a combination of several instructions for the execution of the arithmetic operations for the digital differential analysis as will be apparent from the following description) has been set in the DX part in response to a distribution instruction described later. If the content of the DX part is not zero at the time of execution of the above instruction, the accumulator AC is cleared and then the content of the DX part is multiplied by the content of the address *m*, the result being then stored in the accumulator AC. The above operation will be described in further detail. The content of the DX part is set in a counter (not shown), and the content of the address part *m* is transferred to the memory address register MAR so that the content of the address *m* is read out into the memory register MR. The accumulator AC is then cleared, the content of the address *m* is added to (in case the DX part is negative, subtracted from) the content of the accumulator AC, and a unit is subtracted from (in case the DX part is negative, added to) the content of the counter. The operation described above is repeated until the content of the counter becomes zero, but in the operation succeeding the above operation, the accumulator AC is not cleared.

If, on the other hand, the content of the DX part is zero at the time of execution of the above instruction, a jump to an address specified by the jump address part 1 takes place in order to thereby reduce the time of arithmetic operation. In other words, if no increment is distributed to some integrator, then the control is transferred to another integrator without any wasteful consumption of time by the former integrator.

When an overflow including its sign occurs as a result of the execution of the above instruction, such an overflow is stored in the OVF section of the accumulator AC. The DX part is cleared after the execution of the above instruction.

(2) OP 1 Add/Sub Special (ASS)

This instruction is entirely the same as the instruction OP 0 except that the accumulator AC is not cleared before the execution of the instruction.

(3) OP 2 Servo (SRV)

This instruction is intended to perform such an arithmetic operation which is called the servo operation in a series of arithmetic operations for the digital differential analysis. It is assumed herein that, prior to the execution of this instruction, an increment *dz* delivered as an output from the integrator under consideration or another integrator has been set in the DX part by the distribution instruction described later. If the content of the DX part is not zero at the time of execution of the above instruction, then 0 is set in the accumulator AC if the content of the address *m* is zero, while either the content of the DX part or the content of the DX part inverted in its sign is set in the accumulator AC with their sign affixed thereto when the content of the address *m* is positive and negative, respectively. The above value is set three bits lower than the accumulator AC in the present embodiment. The DX part is cleared after the execution of the above instruction.

If, on the other hand, the content of the DX part is zero, a jump to an address specified by the jump address part 1 takes place as in the case of the instructions OP 0 and OP 1 in order to thereby reduce the time of arithmetic operation.

(4) OP 3 Test and Jump Special (TJS)

This instruction is intended to test the content of an address *m* depending on the content of the control part CTL and to vary both the content of the accumulator AC and the program branching method depending on the test result. More precisely, this is an instruction by which 1 is respectively set in the accumulator AC when the content of the address $m$ is positive (with the 1st bit of the three-bit control part CTL being 1), when the content of the address $m$ is zero, or when the content of the address $m$ is negative (within the 3rd bit being 1). The next instruction to be executed after this instruction is stored in a location which is next to the location of storage of this instruction. If the condition specified above is not satisfied for each individual bit of the control part CTL, the accumulator AC is cleared and a jump to an address specified by the jump address part 1 takes place. The number of tests for the content of the address $m$ is in no way limited to that described above, and a suitable combination between the three bits of the control part CTL and the sign of the content of the address $m$ may realize a variety of tests. Eight tests can be made in the present embodiment since the control part CTL consists of three bits.

(5) OP 4 Add Memory Special (AMS)

This instruction is inteneded to perform such an arithmetic operation in a series of arithmetic operations for the digital differential analysis that the answer obtained by multiplying the content of the Y register by the increment $dx$ should be added to the content of the R register. Suppose now that the answer obtained by multiplying the content of the Y register by the increment $dx$ in accordance with the instruction OP 0 or OP 1 has been put in the accumulator AC. When this instruction is given, the content of an address $m$ is first regarded as the R register, and the most significant bit of the content of the address $m$ is turned into 0 (as the content of the R register is regarded as a positive decimal), the content of the address $m$ being then added to the content of the accumulator AC and stored in the address $m$ again. Then, the result of the above arithmetic operation is checked to find whether an overflow takes place or not. If there is no overflow, the accumulator AC is cleared and a jump to an address specified by the jump address part 1 takes place in order to reduce the time of arithmetic operation. If there is an overflow, the oveflow portion (three bits in the present embodiment) is set at a predetermined position (lower three bits in the present embodiment) in the accumulator AC.

This instruction is usually executed immediately after the execution of the instruction OP 0 or OP 1 referred to previously. Accordingly, when an overflow took place by the execution of the instruction OP 0 or OP 1 and has been stored in the OVF section, the same operation as in the case of the occurrence of the above overflow is performed even if no overflow takes place by the execution of the instruction OP 4.

(6) OP 5 Distribute X (DBX)

This instruction is intended to perform such an arithmetic operation in a series of arithmetic operations for the digital differential analysis that the increment $dz$ derived by the execution of the instruction OP 3 or OP 4 should be regarded as in increment $dx$ and distributed to the specified integrator. That is, if the DZ part of this instruction is 0, the content of the DX part of the instruction OP 0, OP 1 or OP 2 at the specified address is added to the content (lower three bits according to the present embodiment) of the accumulator AC, and the content (lower three bits according to the present embodiment) of the accumulator AC is stored again in the DX part at the address $m$. If, on the other hand, the content of the DZ part is 1, the content (lower three bits according to the present embodiment) of the accumulator AC is subtracted from the content of the DX part at the address $m$ and the result is stored again in the DX part at the address $m$.

(7) OP 6 Distribute Y (DBY)

This is a distribution instruction similar to the instruction OP 5, and is intended to distribute the increment $dz$ as a $dy$ input to the specified integrator and to allow for any desired scaling for the increment. If the increment $dz$ has been set in the accumulator AC prior to the execution of this instruction, then the content of the accumulator AC is added to the content of the Y register specified by the address part $m$ in case the DZ part of this instruction is 0. Prior to the above operation, however, the content of the accumulator AC is shifted to the left by the number of digits specified by the scaling part SCL in order to have a matching between the scale of the Y register and the scale of the increment $dz$ stored in the accumulator AC. If, on the other hand, the content of the DZ part of this instruction is 1, the content (shifted to the left by the number of digits specified by the scaling part SCL) of the accumulator AC is subtracted from the content of the Y register.

EXAMPLE OF PROGRAM EMPLOYING THE ABOVE INSTRUCTIONS

An example for solving a differential equation using both the above instructions and conventional general purpose computer instructions will be described hereunder so that the present invention can more clearly be understood.

Suppose now that a differential equation $$\frac{d^2y}{dx^2}+y=0$$

is to be solved. The above equation may be translated into the form $$dy'+y\cdot dx=0$$

The digital differential analysis of the above equation may be attained by an integrator combination as shown in FIG. 11. In lieu of the patch board or like means heretofore employed for interconnecting the prior integrators constructed from a hardware, the integrators and interconnecting means in the present invention are constructed from software. A program which may be preferably used with the arrangement in FIG. 11 is shown in FIG. 12. In the memory M, the instructions are stored at addresses 0 to 10, while addresses 11 to 15 are reserved for the sake of arithmetic operations. These instructions which are used for the digital differential analysis are stored at the addresses 1 to 9 with the exception of the address 5, while those instructions which are used for the general purpose computation are stored at the addresses 0, 5 and 10. It will thus be understood that the instructions for the digital differential analysis and the instructions for the general purpose computation can both be harmoniously used in the digital computer according to the present invention as will be apparent from FIG. 12.

The instructions for the general purpose computation employed in the program shown in FIG. 12 will briefly be described. CAD (Clear Add) instructions at the addresses 0 and 5 are used to set the content of an address $m$ in the accumulator AC. A UJP (Unconditional Jump) instruction at the address 10 is used to effect an unconditional jump to an address $m$.

The program shown in FIG. 12 will be described in more detail. The instructions stored in the addresses 0 and 1 cause the distribution of an independent variable $dx$ to the integrators. That is, an increment 1 stored at the address 11 is transferred into the accumulator AC in response to the CAD instruction, and the next DBX instruction causes this increment 1 to be set in the specified integrator which is herein the DX part of a CAS instruction stored at the address 2. An arithmetic operation to seek $y'\cdot dx$ is then performed at the address 2 and the result is set in the accumulator AC. In this case, if the DX part is 0, the arithmetic operation to seek $y'\cdot dx$ is unnecessary, and since 3 is set in the jump address part 1, a jump to the address 5, which address number is the sum of the aforesaid address number or its own address number 2 and the relative address number 3 as indicated by 1=3, takes place so that the next instruction can readily be performed without any wasteful loss of time for the arithmetic operation. In response to the appearance of an AMS instruction from the address 3, the result of the arithmetic operation performed to seek $y' \cdot dx$ in accordance with the CAS instruction at the address 2 is added to the content $R_1$ of register at the address 14. When an overflow takes place due to the above addition, the overflow portion is set at the lower three bits of the accumulator AC, while the remaining portion is transferred into the R register at the address 14. Then, in response to the appearance of a DBY instruction from the address 4, the content of the accumulator AC is shifted to the left by the number of bits ($k$ bits) specified by the scaling part SCL and is then added to the Y register at the address 13.

When, however, no overflow takes place after the execution of the AMS instruction, the arithmetic operation described above is no longer necessary, and a jump to a relative address (that is, the address 5) specified by the jump address part 1 of the AMS instruction takes place in order to reduce the time of arithmetic operation. Similarly, at the address 5, a unit is set in the accumulator AC, and at the address 6, a unit is set in the DX part of a CAS instruction at the address 7. That is, the independent variable $dx$ is distributed to the integrator. At the address 7, an arithmetic operation to seek $y \cdot dx$ is performed and the result is stored in the accumulator AC. At the address 8, an AMS instruction transfers the above result to the R register at the address 15 in order to add the value of $y \cdot dx$ to the content $R_2$ of the R register. When no overflow occurs after the execution of the AMS instruction, the accumulator AC is cleared and a jump to the address 10 takes place. When, on the other hand, an overflow occurs after the execution of the AMS instruction, the overflow portion is set at the lower three bits of the accumulator AC, which is then added to the Y register at the address 12 in response to a DBY instruction appearing from the address 9. Then, an unconditional jump to the address 0 takes place in response to the appearance of the UJP instruction from the address 10. The above operations complete one cycle of the program, and the differential equation can be solved by the repetition of the above cycle.

From the foregoing description it will be appreciated that the digital computer according to the present invention can easily and rapidly execute the arithmetic operations for the digital differential analysis by employing such an instruction format which is similar to that employed by a usual general purpose computer.

Figure 1:
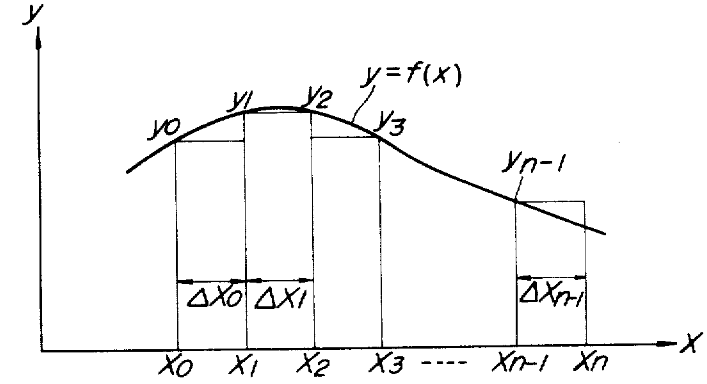
FIG. 1 is a graph illustrating the principle of integration by summing up a set of rectangles.
Figure 2:
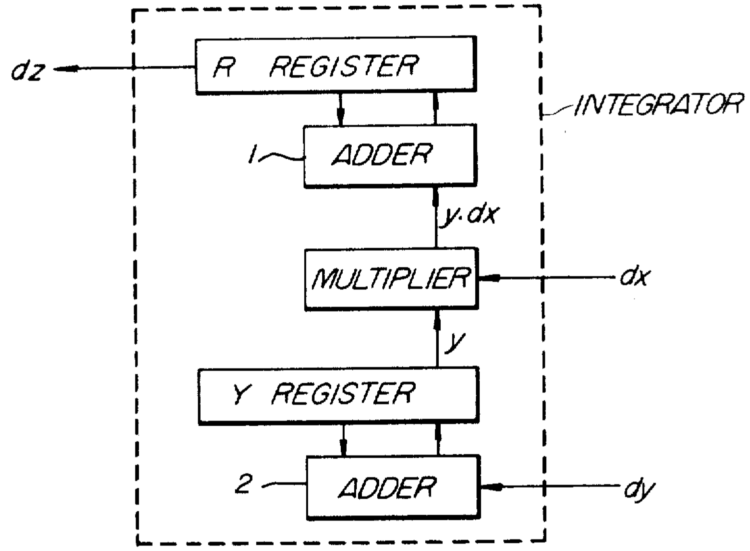
FIG. 2 is a schematic diagram showing the structure of an integrator in a prior art digital differential analyzer.
Figure 3:
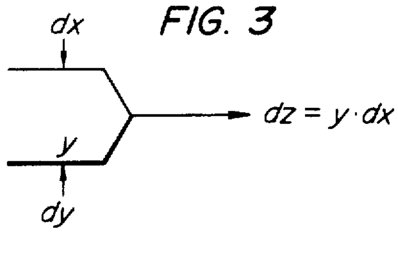
FIG. 3 is a schematic diagram showing the symbol of the integrator shown in FIG. 2.
Figure 4:
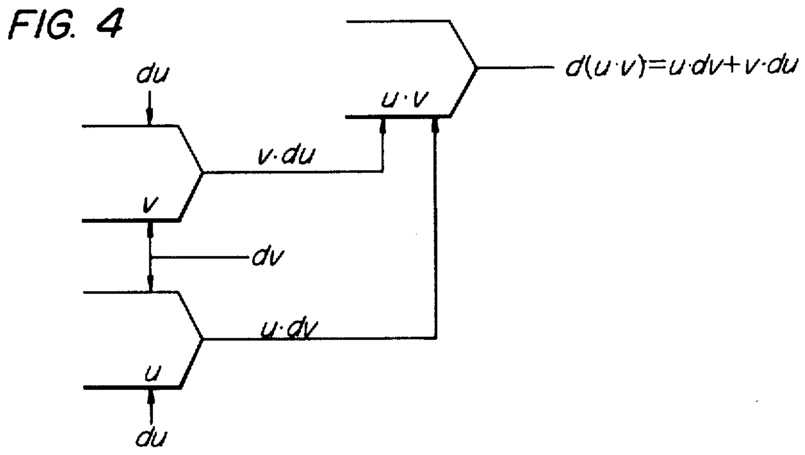
FIG. 4 is a schematic diagram showing a manner of connection between integrators for generating a function by the digital differential analyzer.
Figure 5:
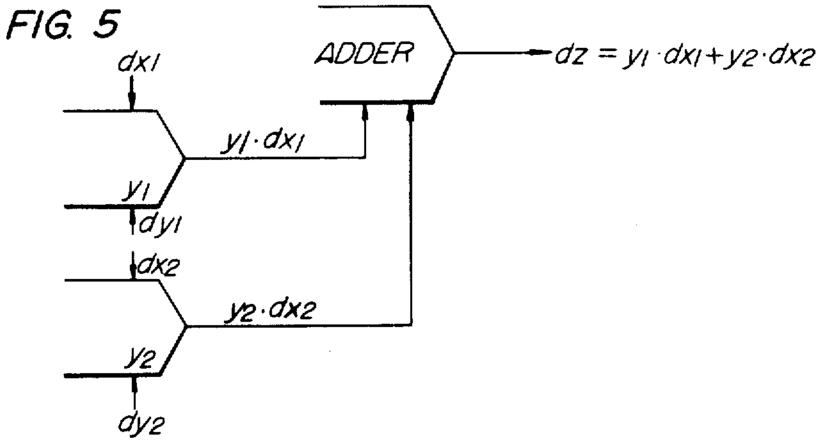
FIG. 5 is a schematic diagram of a system employed in the prior digital differential analyzer for the solution of a specific differential equation.
Figure 6:
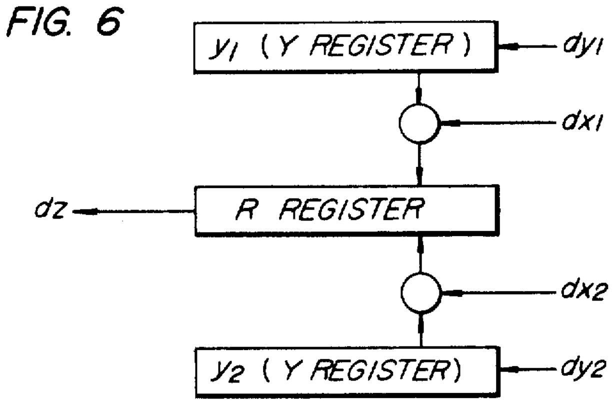
FIG. 6 is a schematic diagram of an improved system according to the present invention, illustrating the fact that the same differential equation can be solved by a smaller number of integrators.
Figure 7:
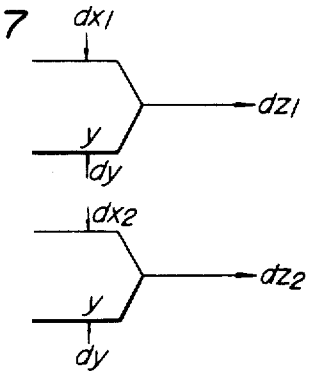
FIG. 7 is a schematic diagram of a system employed in the prior digital differential analyzer for the solution of another specific differential equation.
Figure 8:
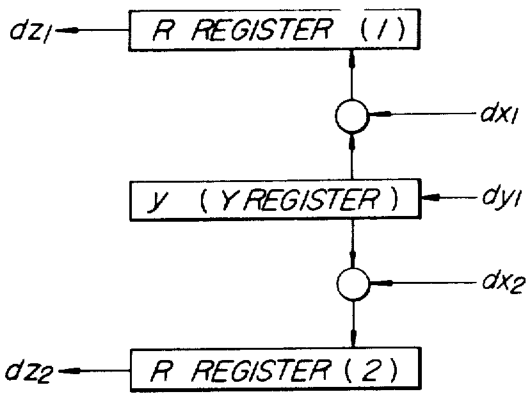
FIG. 8 is a schematic diagram of an improved system according to the present invention, illustrating the fact that the same differential equation can be solved by a smaller number of integrators.

The advantages of the digital computer embodying the present invention will be summarized as follows:

(1) In the digital computer according to the present invention, the R registers and the Y registers can freely be interrelated with each other and the arithmetic operations can be performed with a high degree of precision in spite of the provision of integrators in a smaller number than heretofore, as described in the foregoing and as illustrated in FIGS. 6 and 8.

(2) The increment $dz$ obtained as a result of the execution of the instruction OP 5 or OP 6 can immediately be distributed to the specified integrator as a $dx$ or a $dy$ input thereto and the unit or scale of the increment is freely variable. In prior art digital computers of this kind, any mechanism adapted to make ready distribution of such an increment after the required arithmetic operations was not provided and the arithmetic operations therein were such that increments $dz$ from other integrators were collected in one integrator for the arithmetic computation thereof.

(3) The digital computer according to the present invention has the features of both a digital differential analyzer and a general purpose computer since the instructions employed by the general purpose computer can be incorporated as part of the instructions for the digital computer.

(4) When no overflow occurs or no $dx$ input appears in the course of the arithmetic operations for the digital differential analysis, an unnecessary instruction is skipped to thereby shorten the time of arithmetic operation.

It will be appreciated from the foregoing description that the digital computer according to the present invention has remarkably excellent functions and is very flexible by virtue of the fact that it consists of a hybrid structure of a digital differential analyzer and a general purpose computer and is operative in accordance with a stored program.

We claim:

1. In an automatic data processing apparatus having a memory, an arithmetic unit, means for effecting an exchange of information between said memory and said arithmetic unit and means for deriving information from said memory in accordance with a predetermined sequence of instructions stored in said memory, the method of shortening the time required for said automatic data processing apparatus to carry out arithmetic calculations during its operation comprising:

reading out a first instruction from said memory and executing said first instruction to thereby obtain instruction execution data, delivering execution data to the memory address of a second instruction specified in accordance with said first instruction, to thereby enable said execution data to be employed during the operation of said arithmetic unit in response to the execution of said second instruction, and varying the execution of the instructions in said sequence in response to the existence of execution data in the memory address of each instruction in said sequence, whereby instructions unnecessary for the completion of said arithmetic calculations will be by-passed and as a result, the time required for accomplishing said arithmetic calculations in said automatic data processing apparatus will be reduced.

2. In an automatic data processing apparatus carrying out the method according to claim 1, wherein said step of varying comprises varying the time of execution of the instructions in said sequence.

3. In an automatic data processing apparatus carrying out the method according to claim 1, further including the step of specifying each memory address, to be used in the operation of said apparatus during the execution of said sequence of instructions, by its address relative to the address of the particular instruction being executed.

4. In an automatic data processing apparatus having a memory, an arithmetic unit, means for effecting an exchange of information between said memory and said arithmetic unit and means for deriving information from said memory in accordance with a predetermined sequence of instructions stored in said memory, the method of shortening the time required for said automatic data processing apparatus to carry out arithmetic calculations during its operation, comprising:

reading out a first instruction from said memory and executing said first instruction to thereby obtain instruction execution data, delivering execution data to the memory address of a second instruction specified in accordance with said first instruction, to thereby enable said execution data to be employed during the operation of said arithmetic unit in response to the execution of said second instruction, and by-passing those instructions in said sequence of instructions, the execution of which is unnecessary for the completion of said arithmetic calculations, whereby the time required for carrying out said arithmetic calculations in said automatic data processing apparatus will be reduced.

5. In an automatic data processing apparatus carrying out the method according to claim 4, wherein the step of by-passing comprising by-passing those instructions located in memory addresses in which no execution data has been inserted.

6. In an automatic data processing apparatus carrying out the method according to claim 5, wherein said arithmetic calculation comprises the solving of differential equations.

References Cited

UNITED STATES PATENTS

| | | | |
|---|---|---|---|
| 3,130,299 | 4/1964 | Rathbun et al. | 340—172.5X |
| 3,162,841 | 12/1964 | Holleran | 340—172.5 |
| 3,201,761 | 8/1965 | Schmitt et al. | 340—172.5 |
| 3,293,616 | 12/1966 | Mullery et al. | 340—172.5 |
| 3,197,621 | 7/1965 | Urquhart | 235—152 |
| 3,274,376 | 9/1966 | Evan et al. | 235—150.31 |
| 3,248,706 | 4/1966 | Christensen et al. | 235—152X |
| 3,039,688 | 6/1962 | Moe et al. | 235—152 |

OTHER REFERENCES

F. Lesh: "Methods of Simulating a Differential Analyzer on a Digital Computer," Association for Computing Machinery Journal, vol. 5–6, 1958–9, pp. 281–288.

EUGENE G. BOTZ, Primary Examiner

D. H. MALZAHN, Assistant Examiner